United States Patent
O'Connell et al.

(10) Patent No.: US 10,650,098 B2
(45) Date of Patent: May 12, 2020

(54) CONTENT ANALYZER AND RECOMMENDATION TOOL

(71) Applicant: International Business Machines Corporation, Armonk, NY (US)

(72) Inventors: Kevin M. O'Connell, Rochester, MN (US); Brenda Berg, Rochester, MN (US); Alex Matos, Rochester, MN (US); Janet Cederholm, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/018,189

(22) Filed: Jun. 26, 2018

(65) Prior Publication Data

US 2019/0392036 A1  Dec. 26, 2019

(51) Int. Cl.
*G06F 17/00* (2019.01)
*G06F 17/27* (2006.01)
*G06F 16/23* (2019.01)

(52) U.S. Cl.
CPC ............ *G06F 17/278* (2013.01); *G06F 16/23* (2019.01); *G06F 17/2795* (2013.01)

(58) Field of Classification Search
CPC ........ G06F 16/28; G06F 16/288; G06F 16/30; G06K 9/00483
USPC ........................................................ 382/112
See application file for complete search history.

(56) References Cited

U.S. PATENT DOCUMENTS

| | | | |
|---|---|---|---|
| 8,856,863 B2 | 10/2014 | Lang et al. | |
| 8,958,605 B2 * | 2/2015 | Amtrup | G06K 9/00469 |
| | | | 382/112 |
| 9,535,902 B1 * | 1/2017 | Michalak | G06F 16/38 |
| 9,799,049 B2 | 10/2017 | Balasubramanian et al. | |
| 2005/0262210 A1 | 11/2005 | Yu | |
| 2006/0288285 A1 * | 12/2006 | Lai | G06F 17/2725 |
| | | | 715/708 |
| 2009/0049140 A1 | 2/2009 | Stoddard et al. | |
| 2009/0204596 A1 * | 8/2009 | Brun | G06F 17/278 |
| 2010/0174784 A1 | 7/2010 | Levey et al. | |

(Continued)

OTHER PUBLICATIONS

Anonymously, Intelligent Review System which Analyzes if the Change Made is in Conjugation to the Proposed Review Comment; IP.com No. IPCOM000245472D, Mar. 11, 2016.

(Continued)

*Primary Examiner* — Daniel Abebe
(74) *Attorney, Agent, or Firm* — Patterson + Sheridan, LLP

(57) ABSTRACT

Improved techniques for proactive identification of errors are provided. Documents are analyzed, using natural language processing (NLP) models, to identify entities in the documents. The documents are processed with the NLP models to identify relationships among the entities, and each of the entities is stored in a data store, where the data store further includes an indication of the identified relationships among the entities. A draft correspondence is received, and it is determined that the draft correspondence includes a first entity and a second entity, where the first entity and the second entity have a first relationship. Upon determining that the first relationship conflicts with at least one of the relationships stored in the data store, a suggested revision for the draft correspondence is generated.

19 Claims, 7 Drawing Sheets

(56) References Cited

U.S. PATENT DOCUMENTS

2016/0110424 A1* 4/2016 Goeppinger ...... G06F 16/24573
                                                    707/780
2017/0063962 A1   3/2017 Padmanabhan et al.
2018/0122499 A1* 5/2018 Austin ................... G16H 10/60

OTHER PUBLICATIONS

Anonymously, Automatic location suggestion for new or updated content in social software; IP.com No. IPCOM000242175D, Jun. 23, 2016.

Anonymously, Automatic video and comment suggestions in chat; IP.com No. IPCOM000249288D, Feb. 15, 2017.

Deepak, KV. et al.; "Method and System for Providing Relevant Suggestions for Instant Messaging System," IP.com No. IPCOM000214180D, Jan. 16, 2012.

DiSorbo, et al. "Development Emails Content Analyzer: Intention Mining in Developer Discussions", University of Zurch, Zurich Open Repository and Archive, Nov. 2015, 13 pp.

* cited by examiner

CONTENT ANALYZER AND RECOMMENDATION TOOL

BACKGROUND

The present invention relates to content analytics, and more specifically, to dynamically analyzing documents to identify inaccurate information.

In modern fast-paced environments, a tremendous number of documents (such as correspondences) are prepared and finalized with little time to ensure the finalized content is accurate and complete. As a result, mistakes are frequently made, which can cause significant confusion if they are not noticed. Further, even if these mistakes are identified, additional time and resources must be spent correcting them. Although existing systems can perform basic operations like checking the spelling of a document, more complicated mistakes, which are often far more likely to cause significant problems, are not detectable using existing solutions.

SUMMARY

According to one embodiment of the present disclosure, a method is provided. The method includes analyzing a plurality of documents, using one or more natural language processing (NLP) models, to identify a first plurality of entities and a first plurality of details in the plurality of documents. The method further includes processing the plurality of documents with the one or more NLP models to identify, for each respective entity in the first plurality of entities, one or more details in the first plurality of details that describe the respective entity, wherein a first detail is identified as describing a first entity. Each respective entity of the first plurality of entities and the corresponding one or more details describing the respective entity are stored in a data store. Additionally, the method includes receiving a draft correspondence, and determining that the draft correspondence includes a second entity and a second detail describing the second entity. The method also includes determining that the second entity corresponds to the first entity, based on comparing the second entity with each of the first plurality of entities stored in the data store. Upon determining that the second detail conflicts with the first detail, the method includes generating a suggested revision for the draft correspondence, wherein the suggested revision includes the first detail.

According to a second embodiment of the present disclosure, a computer program product is provided. The computer program product comprises a computer-readable storage medium having computer-readable program code embodied therewith, the computer-readable program code executable by one or more computer processors to perform an operation. The operation includes analyzing a plurality of documents, using one or more NLP models, to identify a first plurality of entities in the plurality of documents, and processing the plurality of documents with the one or more NLP models to identify a first plurality of relationships among the plurality of entities. The operation also includes storing each of the first plurality of entities in a data store, wherein the data store further includes an indication of the identified first plurality of relationships among the first plurality of entities. Further, the operation includes receiving a draft correspondence, and determining that the draft correspondence includes a first entity and a second entity, wherein the first entity and the second entity have a first relationship. Upon determining that the first relationship conflicts with at least one of the first plurality of relationships stored in the data store, the operation includes generating a suggested revision for the draft correspondence According to a second embodiment of the present disclosure, a system is provided. The system includes one or more computer processors, and a memory containing a program which when executed by the one or more computer processors performs an operation. The operation comprises analyzing a plurality of documents, using one or more NLP models, to identify a first plurality of entities and a first plurality of details in the plurality of documents. The operation further includes processing the plurality of documents with the one or more NLP models to identify, for each respective entity in the first plurality of entities, one or more details in the first plurality of details that describe the respective entity, wherein a first detail is identified as describing a first entity. Each respective entity of the first plurality of entities and the corresponding one or more details describing the respective entity are stored in a data store. Additionally, the operation includes receiving a draft correspondence, and determining that the draft correspondence includes a second entity and a second detail describing the second entity. The operation also includes determining that the second entity corresponds to the first entity, based on comparing the second entity with each of the first plurality of entities stored in the data store. Upon determining that the second detail conflicts with the first detail, the operation includes generating a suggested revision for the draft correspondence, wherein the suggested revision includes the first detail.

DETAILED DESCRIPTION

With the increased pace of business and social interactions, it has become increasingly easy to make mistakes when preparing documents or sending correspondence. For example, users may misspell names, mention incorrect dates, provide the wrong location, fail to include important information, and the like. If these mistakes are not identified and corrected, significant problems can arise. For example, if a user in a work setting states in an email that the new CEO is visiting on Friday, when in fact she is visiting on Thursday, the recipients will be unprepared for the visit.

Further, even if the mistake is noticed in time to correct it, additional time and resources must be expended to do so. For example, one or more users must send additional correspondences pointing out the mistake, which adds additional clutter and distractions for all recipients, and some may fail to read the correction in time. There is a need for automated systems to dynamically parse documents and correspondences to identify such mistakes before they are finalized (i.e., before the document is saved or transmitted).

In one embodiment of the present disclosure, an analytics system is provided which may parse correspondences, documents, databases, and the like to identify entities such as times, dates, people, events, locations, and the like. In an embodiment, the analytics application further tags these entities to identify relationships between them. When a document or correspondence is created or modified, the analytics engine can similarly parse this new document and compare it to the previously identified relationships. If a discrepancy or contradiction is found, a correction can be generated and provided to the user, who may either accept or reject it. Based on this interactive process, the analytics model may perform a variety of actions, such as replacing the text corresponding to the error with corrected text, updating one or more data stores based on the response, and the like. Using embodiments disclosed herein, analytics systems can provide improved functionality to users by dynamically identifying entities and relationships and creating and maintaining data structures reflecting these relationships. In this way, mistakes are reduced and productivity and efficiency can be improved.

Figure 1:
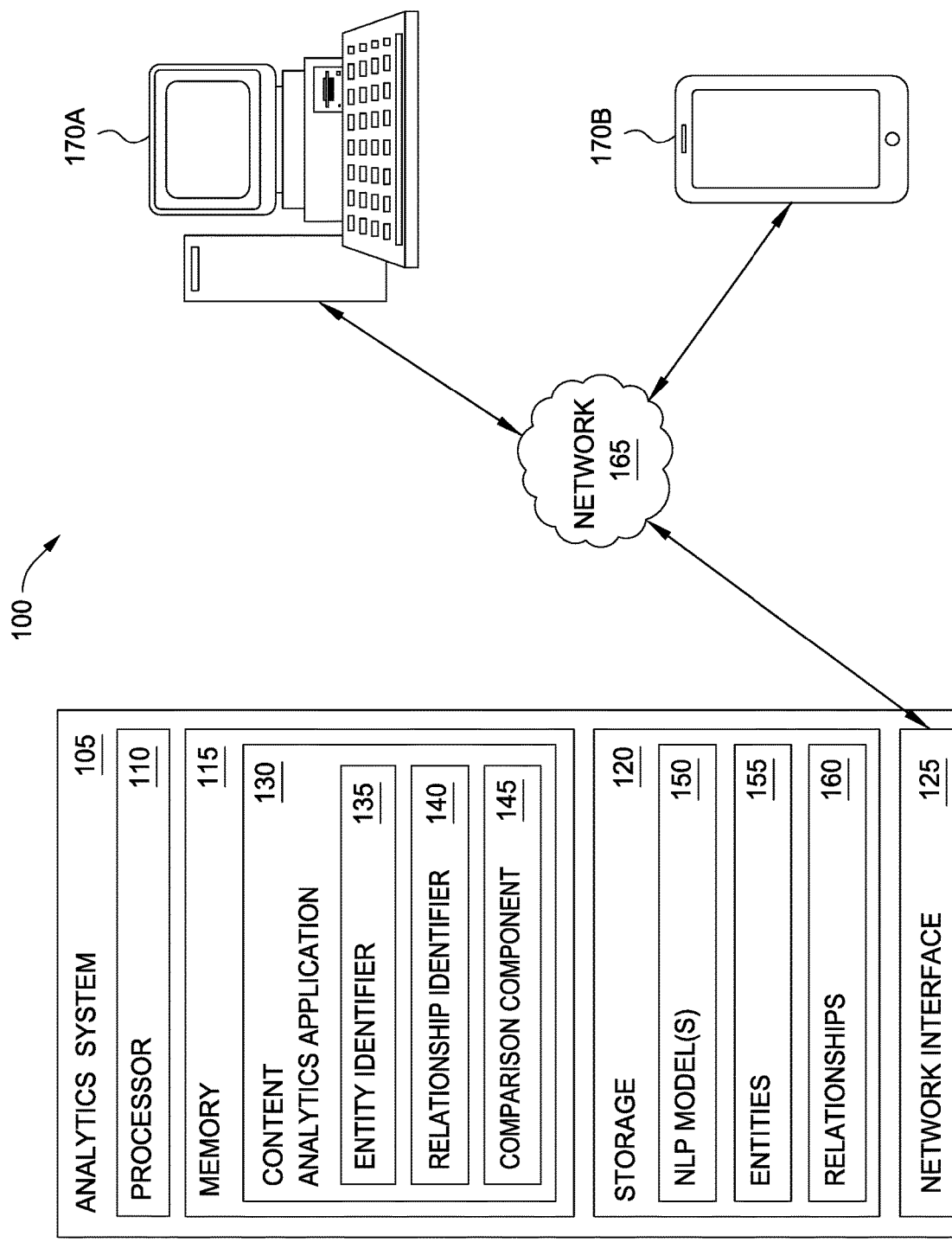
FIG. 1 illustrates a system configured for providing dynamic content analytics, according to one embodiment disclosed herein.

FIG. 1 illustrates a system 100 configured for providing dynamic content analytics, according to one embodiment disclosed herein. The illustrated system 100 includes an Analytics System 105 and two Client Devices 170A and 170B, which communicate via a Network 165. Although the illustrated embodiment depicts the Analytics system 105 as a separate device, in some embodiments, one or more components of it (such as the Content Analytics Application 130) may be stored and executed locally on one or more Client Devices 170A-B. In some embodiments, one or more of the illustrated components may be available either as part of a remote application or service (e.g., on the Analytics System 105), as an application or component on the local device (e.g., on Client Device 170A or 170B), or both (e.g., each Client Device 170A-B may elect whether to access the component locally or remotely).

In the illustrated embodiment, the Client Device 170A is a desktop computer, while Client Device 170B is a mobile device (e.g., a smart phone). In various embodiments, each Client Device 170A-B may be any computing device, including personal assistant devices (PDA), laptops, desktops, tablets, telephones, and the like. Similarly, although the illustrated embodiment includes only two Client Devices 170A-B, in embodiments, any number of Client Devices 170A-B may utilize the Analytics System 105. Further, in various embodiments, the Network 165 may be any communications medium that communicatively couples devices (such as a local network or the Internet) and include wired connections, wireless connections, or a combination of both wired and wireless connections.

As illustrated, the Analytics System 105 includes a Processor 110, a Memory 115, Storage 120, and a Network Interface 125. In the illustrated embodiment, Processor 110 retrieves and executes programming instructions stored in Memory 115 as well as stores and retrieves application data residing in Storage 120. Processor 110 is representative of a single CPU, multiple CPUs, a single CPU having multiple processing cores, and the like. Memory 115 is generally included to be representative of a random access memory. Storage 120 may be a disk drive or flash-based storage device, and may include fixed and/or removable storage devices, such as fixed disk drives, removable memory cards, or optical storage, network attached storage (NAS), or storage area-network (SAN). Through the Network Interface 125, the Analytics System 105 may be communicatively coupled with other remote devices, such as Client Devices 170A-B.

In the illustrated embodiment, the Storage 120 includes one or more NLP Models 150, one or more records corresponding to identified Entities 155, and one or more records corresponding to identified Relationships 160 between the Entities 155. Although illustrated as distinct blocks for simplicity, in embodiments, the Relationships 160 may be stored in the form of tags or metadata associated with each Entity 155, indicating the other Entities 155 to which each respective Entity 155 is related. In some embodiments, each Entity 155 may include other information such as details or descriptors of the Entity 155, in addition to or instead of having associations (in the form of Relationships 160) to other Entities 155. In some embodiments, each Entity 155 includes one or more textual strings representing the Entity 155 (e.g., strings which have been identified and extracted from documents or databases parsed by the Analytics System 105). For example, if one or more users refer to a single event as a "workshop" or a "seminar," the Analytics System 105 may determine that these two strings actually refer to the same event, and associate both strings (and any other identified equivalents or synonyms) with the same Entity 155.

In some embodiments, each Entity 155 also includes an indication as to the type of the respective Entity 155. In one embodiment, an Entity 155 may be an event, a person, a date or time (including date or time ranges), a location, a title, and the like. In some embodiments, each Relationship 160 may similarly include an indication as to the type of relationship. In some embodiments, each Relationship 160 is directionless, and simply indicates some association between the Entities 155. In some embodiments however, a Relationship 160 may indicate a hierarchy, such as a base "event," "person," "date," and the like, along with corresponding "detail" Entities 155. For example, if the Analytics System 105 determines (based on parsing correspondence or documents, or by accessing one or more databases such as a calendar) that an event labeled "workshop" will occur "next Thursday" and will be attended by a person named "Paul," a "workshop" entity may be created and labeled an event, with the Relationships 160 indicating corresponding "detail" entities including "next Thursday," "Paul," and any other details that are associated with the event.

In the illustrated embodiment, the Memory 115 includes a Content Analytics Application 130, which includes several components, including an Entity Identifier 135, a Relationship Identifier 140, and a Comparison Component 145. In an embodiment, the Entity Identifier 135 parses documents, correspondences, and other textual data using one or more NLP Models 150 to identify Entities 155 in the data. For example, in one embodiment, the Entity Identifier 135 may parse one or more textual documents such as emails, text messages, chat logs, memorandums, miscellaneous correspondences, papers, essays, and the like in order to find mentions of various Entities 155 within each document.

In an embodiment, the Relationship Identifier 140 similarly parses the documents to determine relationships between the identified entities based on the NLP Models 150. Although illustrated as a separate component from the Entity Identifier 135, in embodiments, the Relationship Identifier 140 and Entity Identifier 135 may operate as a single unified component. In some embodiments, the Entity Identifier 135 and Relationship Identifier 140 parse documents as they are received, and store the identified Entities 155 and Relationships 160 in a data store (e.g., in a computer database). In some embodiments, the Content Analytics Application 130 may also parse a number of documents at once to update the store. For example, in some embodiments, the Content Analytics Application 130 may parse all previous messages, emails, texts, and documents that are available, in order to build the data store.

In some embodiments, each Relationship 160 may be associated with a weight or confidence. For example, in one embodiment, the weight of each Relationship 160 is based at least in part on the number of times the Content Analytics Application 130 has identified the relationship, the frequency with which the relationship has been identified, how recently the relationship was identified, and the like. In some embodiments, the Content Analytics Application 130 will not provide suggested revisions based on a stored Relationship 160 unless the weight exceeds a predefined threshold. Similarly, in some embodiments, if two Relationships 160 conflict, the Content Analytics Application 130 may determine that the Relationship 160 with the greater weight is the correct one, unless a user indicates otherwise. In some embodiments, the weight of a Relationship 160 may be gradually decreased over time, unless the relationship is identified in a new document.

In some embodiments, each user or client has a respective data store (e.g., a respective set of Entities 155 and Relationships 160) that is curated based on data obtained from the respective user. For example, a first set of Entities 155 and Relationships 160 may be maintained for a first user based on documents associated with that user (e.g., written by the user or transmitted to the user), while a second set of Entities 155 and Relationships 160 are be maintained for a second user based on documents associated with the second user. In this way, each individual user has personalized dynamic Entities 155 and Relationships 160 that can be used by the Comparison Component 145 to identify inaccuracies and remedy them. In some embodiments, this data may be shared across defined groups of users, or a user may choose to share their data with one or more other users. For example, a first user may choose to share their identified Entities 155 and Relationships 160, so that they can be used to check the accuracy of an email prepared by a second user.

In an embodiment, whenever a document is received, the Entity Identifier 135 and Relationship Identifier 140 parse the included text to identify entities and relationships. The Comparison Component 145 may then compare these identified entities and relationships with the pre-identified and stored Entities 155 and Relationships 160 to determine whether a conflict, contradiction, or discrepancy exists. For example, suppose a first user previously sent or received a correspondence that included a phrase such as "Joan and I are driving up to your office next Tuesday." In an embodiment, the data store may be updated to reflect an entity corresponding to a "visit," with associated Entities 155 (reflected in the Relationships 160) for the participants (Joan and the first user), the mode of transportation (driving), the location (the office of the recipient(s)), and the date (next Tuesday). If the first user subsequently prepares a correspondence or document that includes the phrase "my trip to the Northern office on Wednesday morning," the Entity Identifier 135 and Relationship Identifier 140 may identify and generate the entities and relationship data, and the Comparison Component 145 may determine that a conflict exists. That is, the stored Entities 155 and Relationships 160 indicate that the trip is on Tuesday, but the current correspondence indicates that the trip is on Wednesday.

To identify discrepancies, in an embodiment, the Comparison Component 145 uses one or more NLP Models 150 to identify the Entity or Entities 155 that correspond to the newly identified entities. This determination may be made based on a variety of factors, such as how recently each of the stored Entities 155 were recognized in one or more documents, how many times (either in total or in a predefined period of time) the stored Entities 155 were found, and the like. The determination may further be based on how closely the associated details match. For example, if the stored Entity 155 is associated with five other details or Entities 155 (i.e., five Relationships 160), and the currently identified entity and details agree as to one detail but do not match as to the remaining four, it is not likely that the newly identified entity is a match with the previously stored Entity 155. In an embodiment, determining whether the entities match is based at least in part on a number or percentage of associated details that match. In other embodiments, whether the entities match is based on a determination by the one or more NLP Models 150, based on any number of factors. In some embodiments, the Comparison Component 145 may identify a number of potential matching Entities 155, which may each be associated with a confidence measure. In an embodiment, if the confidence measure exceeds a predefined threshold, the entities are considered "matching."

In one embodiment, once it is determined that an entity identified in a document matches with a stored Entity 155, the Comparison Component 145 further determines whether there is a discrepancy between the document and the data store. For example, in one embodiment, the Comparison Component 145 may verify whether each related entity or detail (as indicated in the identified relationships) found in the correspondence matches with the Relationships 160 stored in the data store. If one or more of the new details conflicts with one of the pre-identified details, a discrepancy exists, which the Comparison Component 145 may remedy in a number of ways. In one embodiment, the Comparison Component 145 may select a remedy by prompting a user to select the correct detail. In some embodiments, the Comparison Component 145 selects a remedy based on a variety of factors, such as the age of the stored Entity 155 and Relationship 160 (e.g., Entities 155 or Relationships 160 that have not been found in a document for a predefined period of time may be considered "stale" or no longer accurate), frequency of use (e.g., Relationships 160 that are identified infrequently, or have been identified infrequently lately may be stale), weight of the Relationships 160, and the like.

In a related embodiment, the Comparison Component 145 may identify a discrepancy if it determines that one or more related Entities 155 in the data store are not found in the current correspondence. For example, suppose the stored Relationships 160 indicates that users A, B, and C will participate in a meeting, and the current document mentions that users A and C will be attending the meeting. In such an embodiment, the Comparison Component 145 may identify a discrepancy because user B is not mentioned in the current correspondence. In various embodiments, the Comparison Component 145 may remedy this deficiency in a number of ways, such as by removing the Entity 155 and/or Relationship 160 indicating that user B is a participant, or suggesting that the current document be edited to include a mention of user B as a participant.

In another embodiment, the Comparison Component 145 may identify a discrepancy based on determining that one or more entities or relationships are present in the current document, but are not reflected in the Entities 155 and Relationships 160. In such an embodiment, the Comparison Component 145 may update the data store by adding this new detail to the data store in the form of one or more Entities 155 and/or Relationships 160. In this way, the data store (e.g., the Entities 155 and Relationships 160) is dynamically updated as new documents are ingested. Further, as discussed above, in some embodiments, if the identified relationship is already present in the data store, the Content Analytics Application 130 may increase the weight of the Relationship 160 to reflect that it was identified again.

In an embodiment, whenever a discrepancy is identified the Comparison Component 145 may also generate a recommendation to the user, which may include one or more suggested revisions. These revisions may vary based on the particular discrepancy and other factors, and may include operations such as adding text to the current document, removing text from the current document, and substituting text in the current document with alternative text. For example, a date may be revised to indicate the correct date, text corresponding to a participant may be removed from the document, text specifying a location may be added, and the like.

In some embodiments, the Content Analytics Application 130 receives documents from Client Devices 170A-B, parses them, and returns the results to the Client Device 170A-B. In some embodiments, the Content Analytics Application 130 may correct the inaccuracies or discrepancies and subsequently forward the document to the identified recipients without prompting the user. In some embodiments, the Content Analytics Application 130 generates a confidence measure for each suggested revision. If the confidence is above a predefined threshold, the revision may be automatically accepted. Similarly, in an embodiment, if the confidence is below a predefined threshold, the revision is automatically rejected. Finally, if the confidence measure is between the thresholds (e.g., in a predefined range), the revision may be transmitted to the user for approval. In some embodiments, the confidence measure may be based at least in part on the weight of the Relationship 160 that the suggested revision is based on. Further, in some embodiments, the Content Analytics Application 130 may operate on each Client Device 170A-B and parse documents as discussed above before they are sent. In some embodiments, the Content Analytics Application 130 may access the NLP Models 150, Entities 155, and/or Relationships 160 on one or more remote servers, such as in a cloud computing environment.

Figure 2:
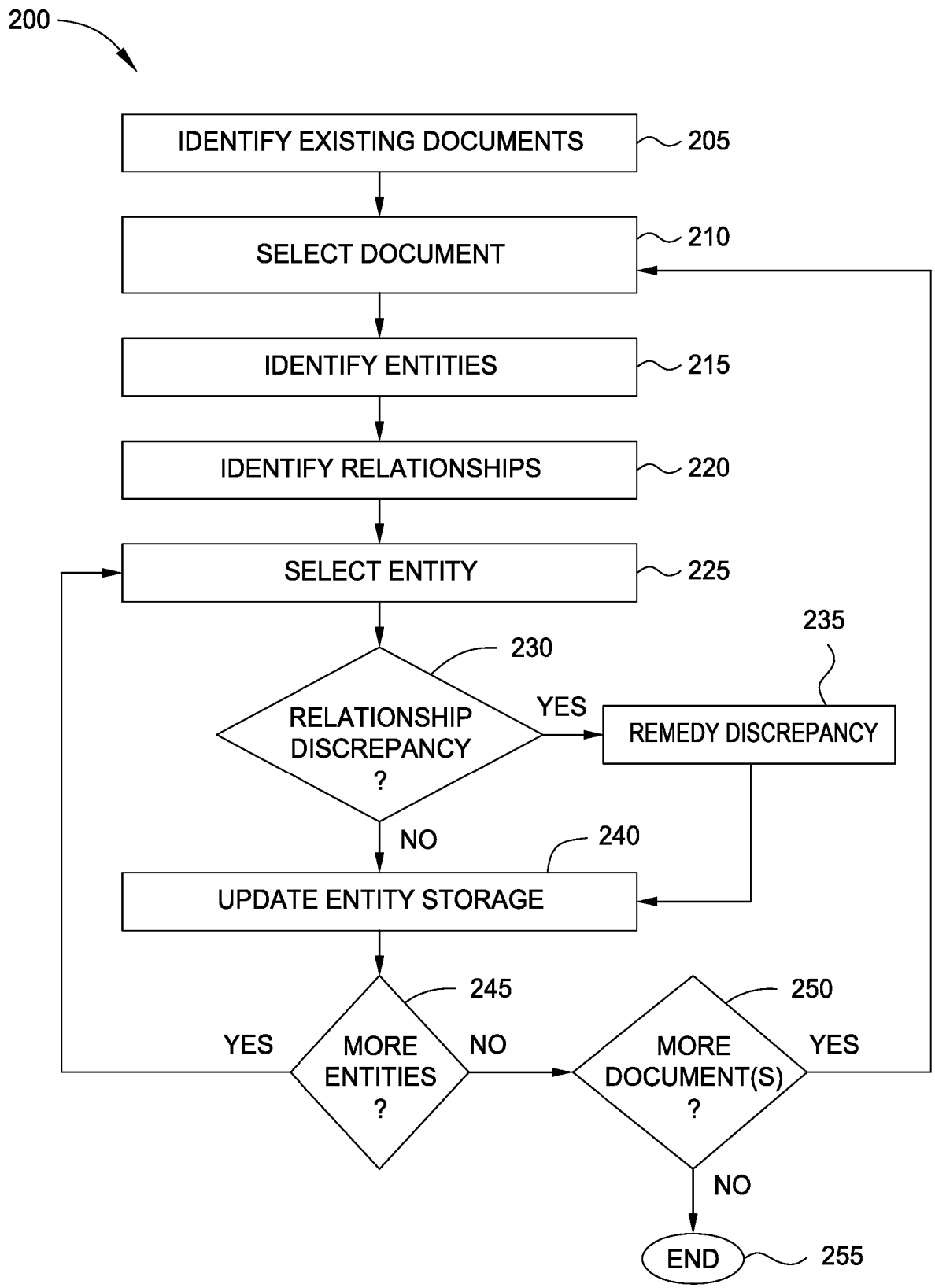
FIG. 2 is a flow diagram illustrating a method of building an entity store for dynamic content analytics, according to one embodiment disclosed herein.

FIG. 2 is a flow diagram illustrating a method 200 of building an entity store for dynamic content analytics, according to one embodiment disclosed herein. The method 200 begins at block 205, where the Content Analytics Application 130 identifies any existing documents that are to be parsed. In some embodiments, these documents may be provided or identified by a user or administrator. For example, in one embodiment, the user may specify a particular repository to parse, a particular type of correspondence, a date range, a subject to search for, and the like. The method 200 then proceeds to block 210, where the Content Analytics Application 130 selects a first document from the identified corpus. At block 215, the Content Analytics Application 130 identifies entities in the selected document, based on processing the document with one or more NLP models. Similarly, at block 220, the Content Analytics Application 130 identifies relationships between these entities using the NLP model(s). In some embodiments, identifying relationships between entities comprises identifying details associated with each entity. For example, as discussed above, an "event" or "trip" entity may have a number of associated details including attendants, participants, date, time, location, and the like.

The method 200 then proceeds to block 225, where the Content Analytics Application 130 selects a first entity of the entities that have been identified in the selected document. At block 230, the Content Analytics Application 130 (e.g., the Comparison Component 145) determines whether there are any discrepancies between the identified relationships in the document, and the stored Relationships 160 in the data store. As discussed above, in an embodiment, this involves first determining whether each identified entity in the document matches with or refers to the same thing as an Entity 155 in the data store. In one embodiment, the Comparison Component 145 utilizes one or more NLP Models 150 to compare the stored Entities 155 and the newly identified entities, in order to determine whether they refer to the same thing. This may be based on the naming used for the entity, the identified details or related entities, the user(s) who is the author or recipient of the document, and the like. In an embodiment, if no matching Entity 155 is found, the Comparison Component 145 determines that there is no discrepancy.

In some embodiments, as discussed above, identifying discrepancies comprises determining, for each entity, whether the corresponding identified details conflict or differs from the details associated with the corresponding stored Entity 155. For example, as discussed above, if the data store indicates that a trip to New York is on a particular date, a conflict or discrepancy may exist if the current message indicates that the trip is on a differing date. Of course, in embodiments, a discrepancy may not exist if the underlying entities are not matching. For example, in one embodiment, the Comparison Component 145 may determine that although the current document references a trip to New York, it is referring to a different trip than the one stored in the data store. This may be based on a variety of factors, such as a number of percentage of details or relationships that match between the document and the stored entity, the user(s) preparing or receiving the document, the timing of each identified entity (e.g., when each identified trip is to occur), how recently or frequently the entities have been identified in one or more documents, the weight of the stored Relationships 160, and the like.

If the Comparison Component 145 determines that a discrepancy exists, the method 200 proceeds to block 235, where the discrepancy is remedied. In one embodiment, remedying the discrepancy consists of prompting one or more users to confirm which detail or relationship is correct. In some embodiments, the user can also indicate that both are correct (if they are not contradictory), or that the identified entities are in fact separate entities. For example, the user may indicate that the trip to New York is with both Bob and Sue, but not that the trip is both Thursday and Tuesday. Similarly, the user may indicate that there are in fact two separate trips, one with Bob and one with Sue, or one on Tuesday and another on Thursday. In some embodiments, however, the user may not be available to provide the correction. For example, the method 200 may process a large number of prior documents, and it may be infeasible for a user to remedy each discrepancy manually.

In some embodiments, the Comparison Component 145 may remedy discrepancies automatically. For example, in one embodiment, the Comparison Component 145 may correct discrepancies based on how frequently or how recently each conflicting detail was present in a document. If one of the details has only been found in a single document (or comparatively fewer documents), the weight associated with that Relationship 160 may be relatively low. Similarly, if the other detail or relationship has been found in comparatively more, the weight of that Relationship 160 will be higher. In an embodiment, the Comparison Component 145 determines that the detail or relationship with the higher weight is the correct detail. Similarly, if one detail has been found much more frequently in more recent documents, the weight may be higher and the Comparison Component 145 may determine that the more recent detail is the correct one. In such an embodiment, remedying the discrepancy may therefore be based in part on data in the data store indicating a weight of the link, or reflecting how often and how recently each detail has been detected. In some embodiments, if there is insufficient data to remedy the discrepancy immediately, the Comparison Component 145 may decline to select a correct Relationship 160 immediately, and continue to process additional documents. The Comparison Component 145 may return later to remedy the discrepancy, once additional data is collected or once all documents have been processed.

The method 200 then proceeds to block 240, where the Content Analytics Application 130 updates the entity store. For example, as discussed above, if the discrepancy can be remedied (or there is no discrepancy), the data store (i.e., the Entities 155 and Relationships 160) may be updated to reflect the correct information. Similarly, in some embodiments, each Entity 155 and/or Relationship 160 may include additional data or metadata indicating how many times each has been found in a document, as well as when each instance was identified (or when the document associated with each identified instance was prepared). In some embodiments, each Entity 155 and/or detail includes one or more textual strings extracted from the documents. For example, if a user refers to a trip as a "business trip," "trip," "visit," "flight to New York," and other terms, these strings may be stored along with the corresponding Entity 155, in order to facilitate identification of future references to the same entity or detail.

Once the data store has been updated, the method 200 proceeds to block 245, where the Comparison Component 145 determines whether there are additional entities in the selected document. If so, the method 200 returns to block 225 to select the next entity. Although the method 200 is illustrated as if the Entity Identifier 135 identifies all entities before the Comparison Component 145 processes them, in some embodiments, an entity may be identified, the relationships may be determined, and the entity may be processed by the Comparison Component 145. In such an embodiment, the method flow returns to identify the next entity only once the Comparison Component 145 has finished processing the first entity. In the illustrated embodiment, if there are no additional entities in the selected document, the method 200 proceeds to block 250, where the Content Analytics Application 130 determines whether there are additional documents in the corpus. If so, the method 200 returns to block 210 to select the next document. Otherwise, the method 200 terminates at block 255.

Although the illustrated embodiment involves parsing documents, in some embodiments, the Content Analytics Application 130 may access other data sources to populate the data store. For example, in some embodiments, the Content Analytics Application 130 may access a calendar application to identify events and details about each event, in order to create corresponding Entities 155 and Relationships 160. In some embodiments, the Content Analytics Application 130 may also connect to systems such as employee directories, manufacturing catalogs, and the like. Doing so may provide additional functionality to the system. For example, suppose a correspondence mentions that "the new units will ship in February, at $40 each." If the Content Analytics Application 130 collects data from these additional sources, it may recognize that the units are in fact expected to be $50 each, or will ship in March, even if there have not been any correspondences or documents that mentioned this information. Of course, in some embodiments, these additional data sources may simply be additional documents that the Content Analytics Application 130 is allowed to analyze and ingest.

Figure 3:
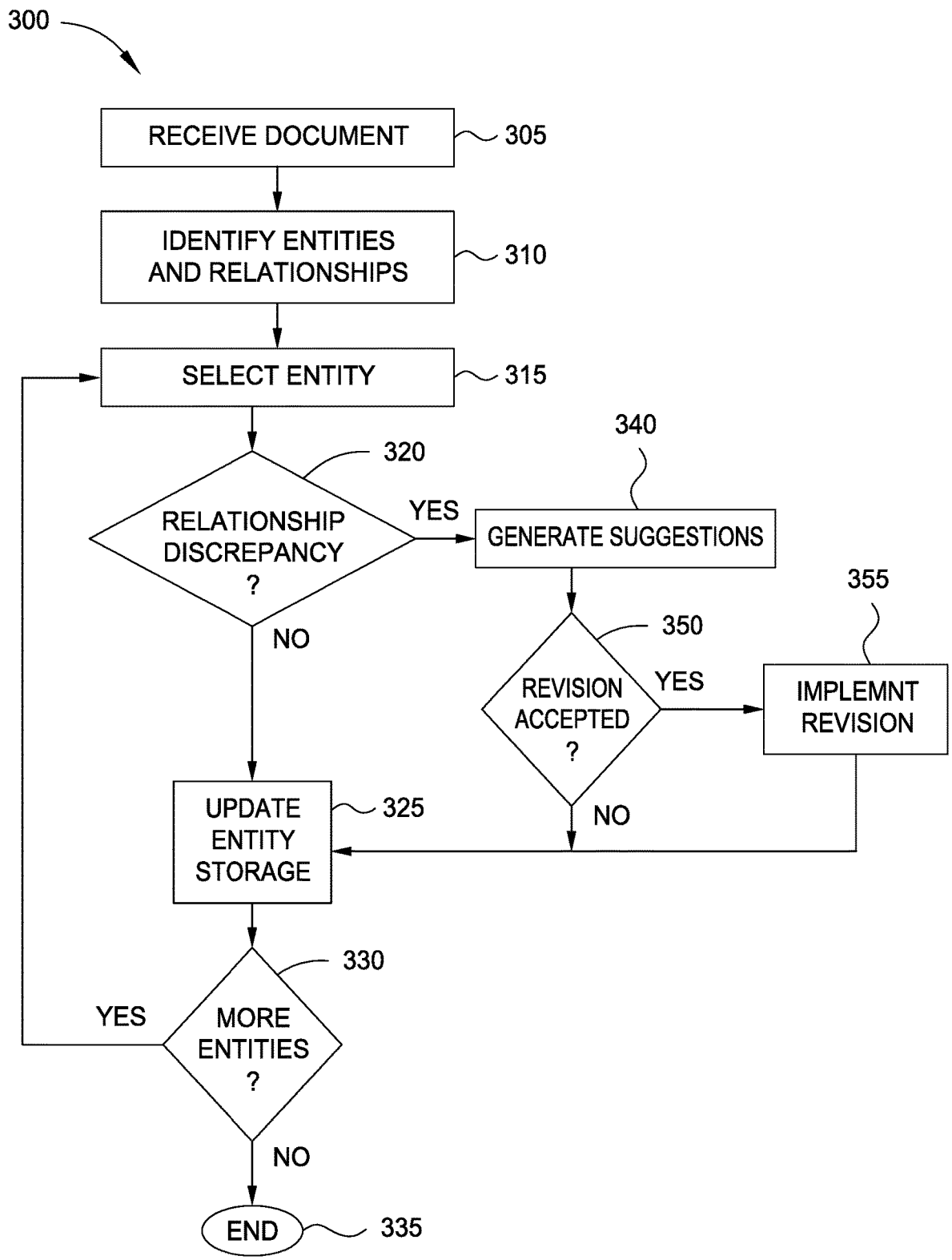
FIG. 3 is a flow diagram illustrating a method of providing content analytics and dynamic recommendations, according to one embodiment disclosed herein.

FIG. 3 is a flow diagram illustrating a method 300 of providing content analytics and dynamic recommendations, according to one embodiment disclosed herein. In one embodiment, the method 300 operates in real-time, rather than on a corpus of prior documents. For example, in an embodiment, the method 300 is used to analyze documents as they are drafted, in order to identify inaccuracies or mistakes before they are finalized. In some embodiments, the method 300 is performed once the draft is completed and the user submits it for processing (e.g., when the user clicks "send" on a correspondence). In some embodiments, the method 300 is performed live and in real-time as the user prepares the document. For example, in one embodiment, as the user enters text into a document, the Content Analytics Application 130 may parse the text repeatedly to provide dynamic suggestions while the user types.

The method 300 begins at block 305, where the Content Analytics Application 130 receives a textual document (or any textual string). At block 310, the Content Analytics Application 130 identifies entities and relationships between entities (or entities and details about each entity). The method 300 then proceeds to block 315, where the Content Analytics Application 130 selects a first entity for processing. At block 320, the Content Analytics Application 130 determines whether there is a discrepancy between the selected entity/details/relationships, and any Entity 155 or Relationship 160 in the data store. If not, the method 300 proceeds to block 325, where the Content Analytics Application 130 updates the data store. For example, if there is no matching entity already in the storage, the Content Analytics Application 130 may create and store one or more new Entities 155, along with any identified Relationships 160 or details. Similarly, if the received document provides additional details, relationships, or entities related to an existing Entity 155, the Content Analytics Application 130 may update the data store to reflect this new information.

If, at block 320, it is determined that a discrepancy exists, the method 300 proceeds to block 340, where the Content Analytics Application 130 generates one or more suggested revisions for the document. In one embodiment, the revision may be to either add information that is found in the data store but not in the document, to remove information found in the document but not in the data store, or to replace information in the document with information in the data store. In one embodiment, the revision is provided to the user in the form of a popup box, allowing the user to accept or reject the suggestion. In some embodiments, rather than interrupting the user, a visual indication is displayed to the user to indicate the suggested revision. For example, in some embodiments, the text segment to be revised may be highlighted or outlined. In one embodiment, the user must click or mouse-over the text segment to see the suggested revisions.

In some embodiments, the Content Analytics Application 130 may generate several revisions, as well as a confidence measure for each revision. As discussed above, in some embodiments, revisions are generated based at least in part on the Entities 155 and Relationships 160 in the data store, as well as a weight associated with each Relationship 160. In one embodiment, each revision is only provided to the user if it has a sufficiently high confidence. In some embodiments, if the confidence is above a predefined threshold, it is automatically accepted and inserted into the document. At block 350, the Content Analytics Application 130 determines whether the revision was accepted. If so, the method 300 proceeds to block 355, where the Content Analytics Application 130 implements the revision (e.g., adds text, removes text, or substitutes text). The method 300 then proceeds to block 325. Similarly, if the user declines the revision, the method 300 proceeds to block 325.

In some embodiments, in addition to rejecting the revision, the user may also specify why the revision was rejected. For example, in one embodiment, the user may indicate that the revision is incorrect. This may indicate that the NLP Models 150 were mistaken, or that the data store contains incorrect data. In another embodiment, the user may indicate that the revision is correct, but that it is rejected because the details have changed. For example, if an event was originally scheduled for a Tuesday but has been moved to Monday, the user may provide such an indication. This indicates that the models and data store were still accurate. Further, in an embodiment, the user may indicate that the currently referenced entity is different from the stored Entity 155. At block 325, the Content Analytics Application 130 updates the entity storage system.

In an embodiment, the manner in which the data store is updated may depend on whether the revision was accepted or rejected, and why the revision was rejected. For example, if the revision was accepted, the data store may be updated to reflect that the entity or relationship has been identified in the current document, which may include incrementing a counter or including an indication of the current date and/or time. If the revision was rejected, the Content Analytics Application 130 may update the entity store to reflect the rejection. For example, if the revision was incorrect, the Content Analytics Application 130 may update the entity store to remove the incorrect information, or to reduce the importance or weight associated with the corresponding Entity 155 or Relationship 160. In this way, the incorrect revision may be less likely to be suggested, or may be removed entirely. Similarly, if the user indicates that the current document is referencing a distinct entity, the Content Analytics Application 130 may update the entity store by adding a new Entity 155 and Relationships 160 to reflect this new information. The method 300 then proceeds to block 330, where the Content Analytics Application 130 determines whether additional entities remain in the document. If so, the method 300 returns to block 315. If not, the method 300 terminates at block 335.

Figure 4A:
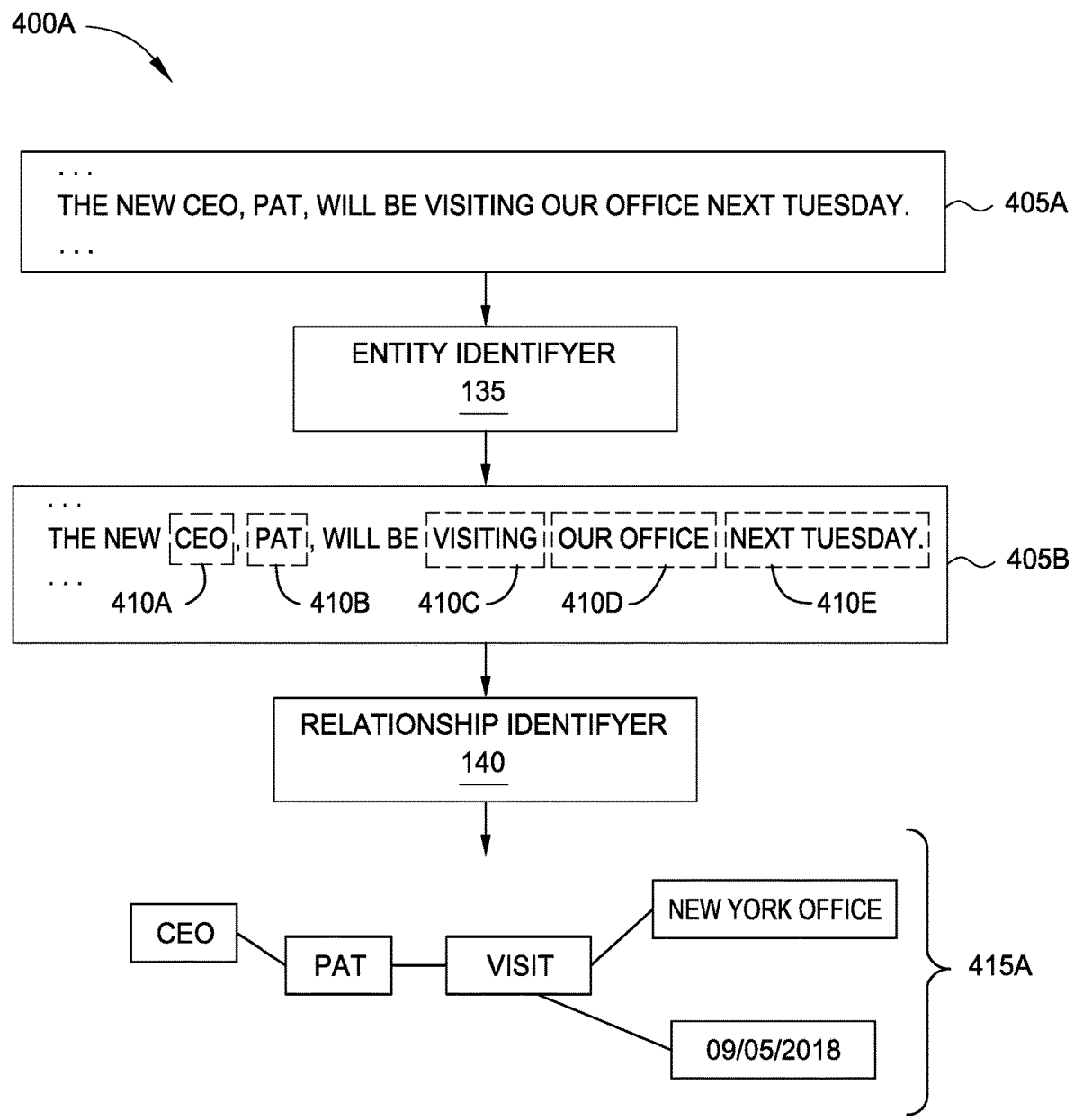
FIG. 4A illustrates a workflow for identifying inaccurate content and providing recommendations, according to one embodiment disclosed herein.

FIG. 4A illustrates a workflow 400A for identifying inaccurate content and providing recommendations, according to one embodiment disclosed herein. In the illustrated workflow 400A, a text segment is illustrated in block 405A, and reads "The new CEO, Pat, will be visiting our office next Thursday." As indicated by the ellipses above and below the text, the received document or string may be any length, and is not limited to a single sentence or phrase. In the illustrated workflow 400A, the text is provided to the Entity Identifier 135, which identifies entities in the text using one or more NLP models. As illustrated in block 405B, each identified Entity 410A-E is outlined with a dotted line. Of course, in embodiments, the entity identification process may not include any visualization, and may occur without the user receiving any indication as to the entities that have been identified.

In the illustrated workflow 400A, an Entity 410A corresponds to a text segment or string that includes "CEO." This may be identified as an entity because it is a title, profession, or label, or because it is a detail or modifier for the next Entity 410B, "Pat." In some embodiments, the Entity 410A may also include "new," to distinguish it from another entity referring to an "old CEO" or "former CEO." Similarly, an Entity 410C is identified, which includes the text "visiting." In an embodiment, this may be identified as a "visit," "trip," or "event" entity. Additionally, Entity 410D includes "our office," and Entity 410E includes "next Tuesday."

As illustrated, the Relationship Identifier 140 then parses the document (or the identified Entities 410A-E) to identify the relationships between each Entity 410A-E. In the illustrated workflow 400A, this is illustrated by the graph 415A, where each node represents an identified Entity 410A-E, and each edge represents a relationship or association. Although the illustrated embodiment includes a graph structure, in various embodiments, the data store may take other forms, such as a database with records corresponding to each entity, and relationships represented by information in each record. In the illustrated embodiment, the entity "Pat" is related to "CEO" because "CEO" is a descriptor or detail about "Pat." Based on this association, if the Content Analytics Application 130 subsequently identifies "Pat" in a document, and can determine that the user is referring to the CEO. Similarly, if a document says "the CEO is visiting," the Content Analytics Application 130 can determine that "Pat" is visiting. Further, if a document says "the CEO, Bob" the Content Analytics Application 130 can identify this discrepancy as a mistake, and respond accordingly.

In the illustrated embodiment, "Pat" is also related to "visit" because the Content Analytics Application 130 determined that "Pat" will be an attendant or participant in the "visit" entity. That is, "Pat" may be considered a detail or descriptor associated with the "visit" entity. Similarly, the "visit" entity may be a detail or descriptor associated with "Pat," because it is an action or event "Pat" will be taking. As further illustrated, the Content Analytics Application 130 has determined that "our office" refers to an entity corresponding to a "New York Office." This determination may be based on a variety of factors. For example, the Content Analytics Application 130 may determine an identity of the user who wrote the text "our office," and determine which office is begin referred to based on this information. Similarly, the Content Analytics Application 130 has converted the string "next Tuesday" to a particular date: Sep. 5, 2018. This may be achieved by, for example, accessing a calendar to determine which date is "next Tuesday" from the perspective of the date and/or time when the text was written. In this way, the Content Analytics Application 130 can identify later references to the same date or event, regardless of how it is phrased in the text.

Figure 4B:
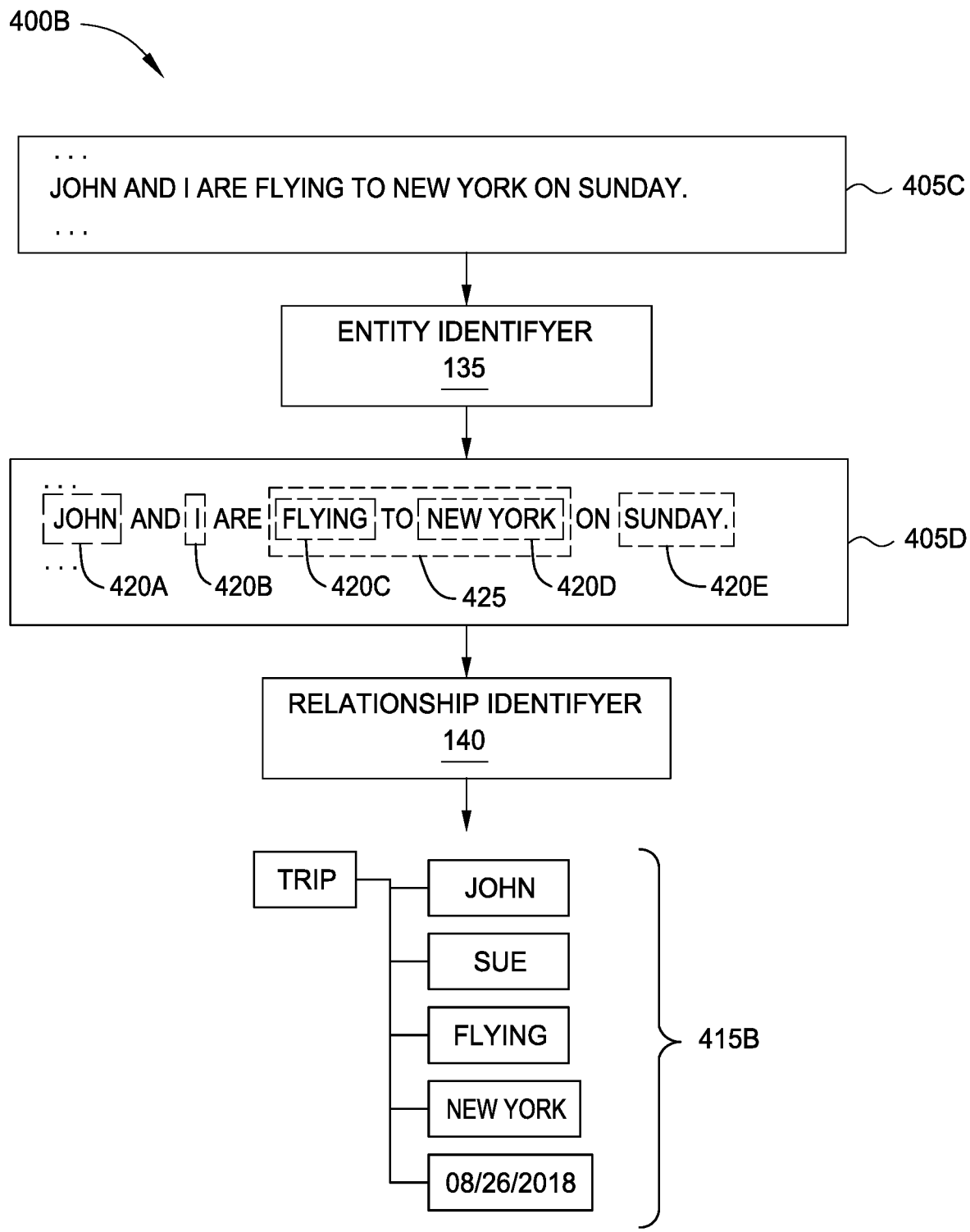
FIG. 4B illustrates a workflow for analyzing content to identify inaccurate details and provide recommendations, according to one embodiment disclosed herein.

FIG. 4B illustrates a workflow 400B for analyzing content to identify inaccurate details and provide recommendations, according to one embodiment disclosed herein. In the illustrated workflow 400B, the Content Analytics Application 130 is configured to identify entities, and associated details or descriptors for each entity. In some embodiments, each detail is also referred to as an entity, and the relationship that is identified defines the nature of the connection. As illustrated in the block 405C, the input document includes the string "John and I are flying to New York on Sunday." Further, as illustrated by the dashed outlines in block 405D, the Entity Identifier 135 has identified an Entity 425 corresponding to an event, based on the string "flying to New York." The Content Analytics Application 130 has further identified several Details 420A-E, including "John," "I," "flying," "New York," and "Sunday."

Further, in the illustrated workflow 400B, the Relationship Identifier 140 has constructed a hierarchical data structure 415B with a "trip" entity, and several details or descriptors. Of course, in some embodiments, the hierarchical data structure 415B may be implemented integrated with the graph 415A. For example, in one embodiment, a graph may be constructed with each node in the graph corresponding to an entity, edges corresponding to relationships between entities, and a set of elements within each entity node indicating the details or descriptors for the entity. Further, in some embodiments, storage structures such as a database may be used. For example, in one embodiment, each record in the database may correspond to a particular entity, and each record may include one or more pointers to other record(s) that correspond to related entities. Similarly, the record may include information about the details or descriptors of each entity. Of course, the particular data structures discussed are purely for illustrative purposes, and are not intended to be limiting on the embodiments disclosed herein.

Figure 5:
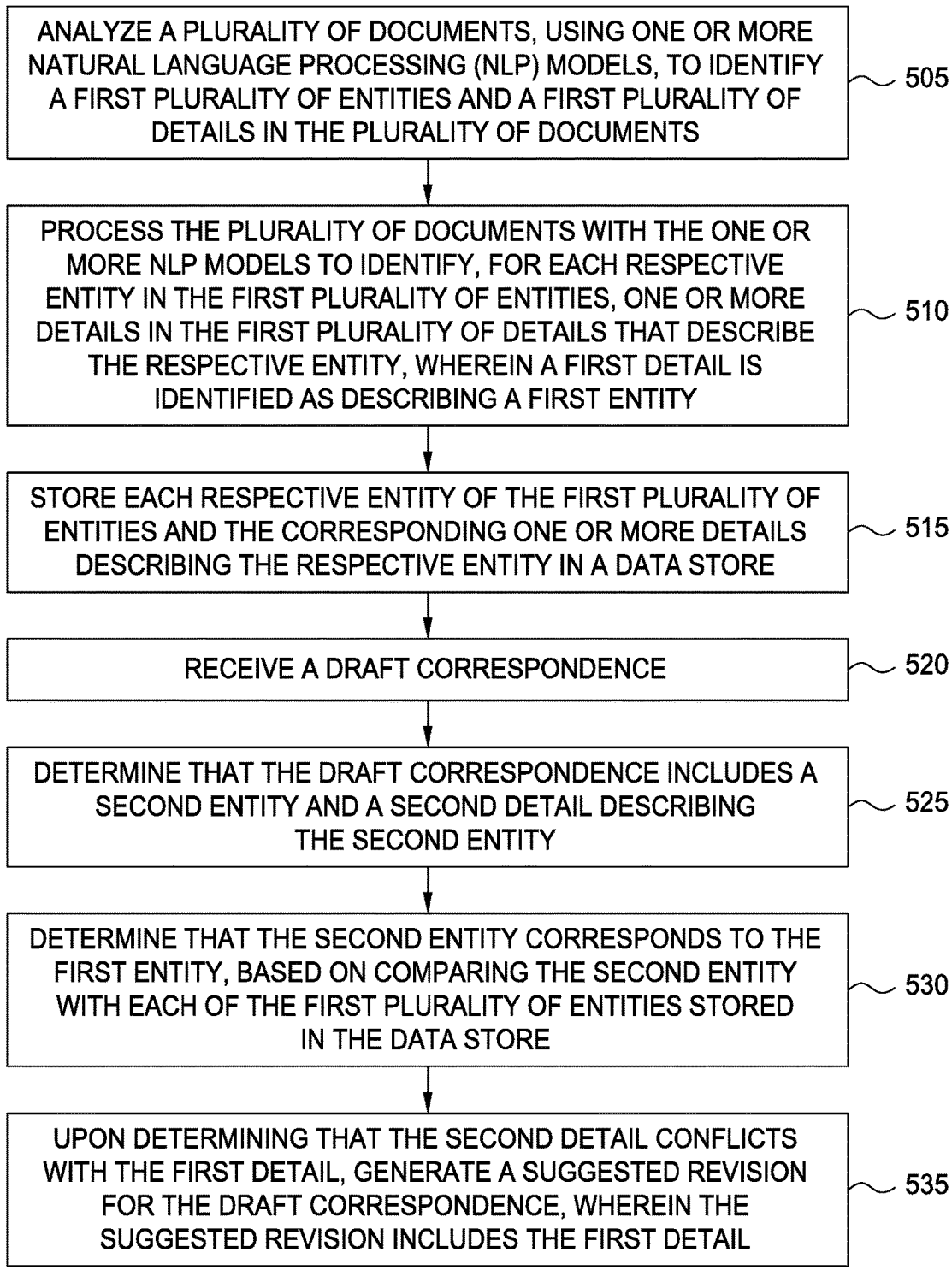
FIG. 5 is a flow diagram illustrating a method for providing content analytics, according to one embodiment disclosed herein.

FIG. 5 is a flow diagram illustrating a method 500 for providing content analytics, according to one embodiment disclosed herein. The method 500 begins at block 505, where the Content Analytics Application 130 analyzes a plurality of documents, using one or more natural language processing (NLP) models, to identify a first plurality of entities and a first plurality of details in the plurality of documents. The method 500 then proceeds to block 510, where the Content Analytics Application 130 processes the plurality of documents with the one or more NLP models to identify, for each respective entity in the first plurality of entities, one or more details in the first plurality of details that describe the respective entity, wherein a first detail is identified as describing a first entity. At block 515, the Content Analytics Application 130 stores each respective entity of the first plurality of entities and the corresponding one or more details describing the respective entity in a data store. At block 520, the Content Analytics Application 130 receives a draft correspondence. The method 500 continues to block 525, where the Content Analytics Application 130 determines that the draft correspondence includes a second entity and a second detail describing the second entity. Further, at block 530, the Content Analytics Application 130 determines that the second entity corresponds to the first entity, based on comparing the second entity with each of the first plurality of entities stored in the data store. Finally, the method 500 continues to block 535, where, upon determining that the second detail conflicts with the first detail, the Content Analytics Application 130 generates a suggested revision for the draft correspondence, wherein the suggested revision includes the first detail.

Figure 6:
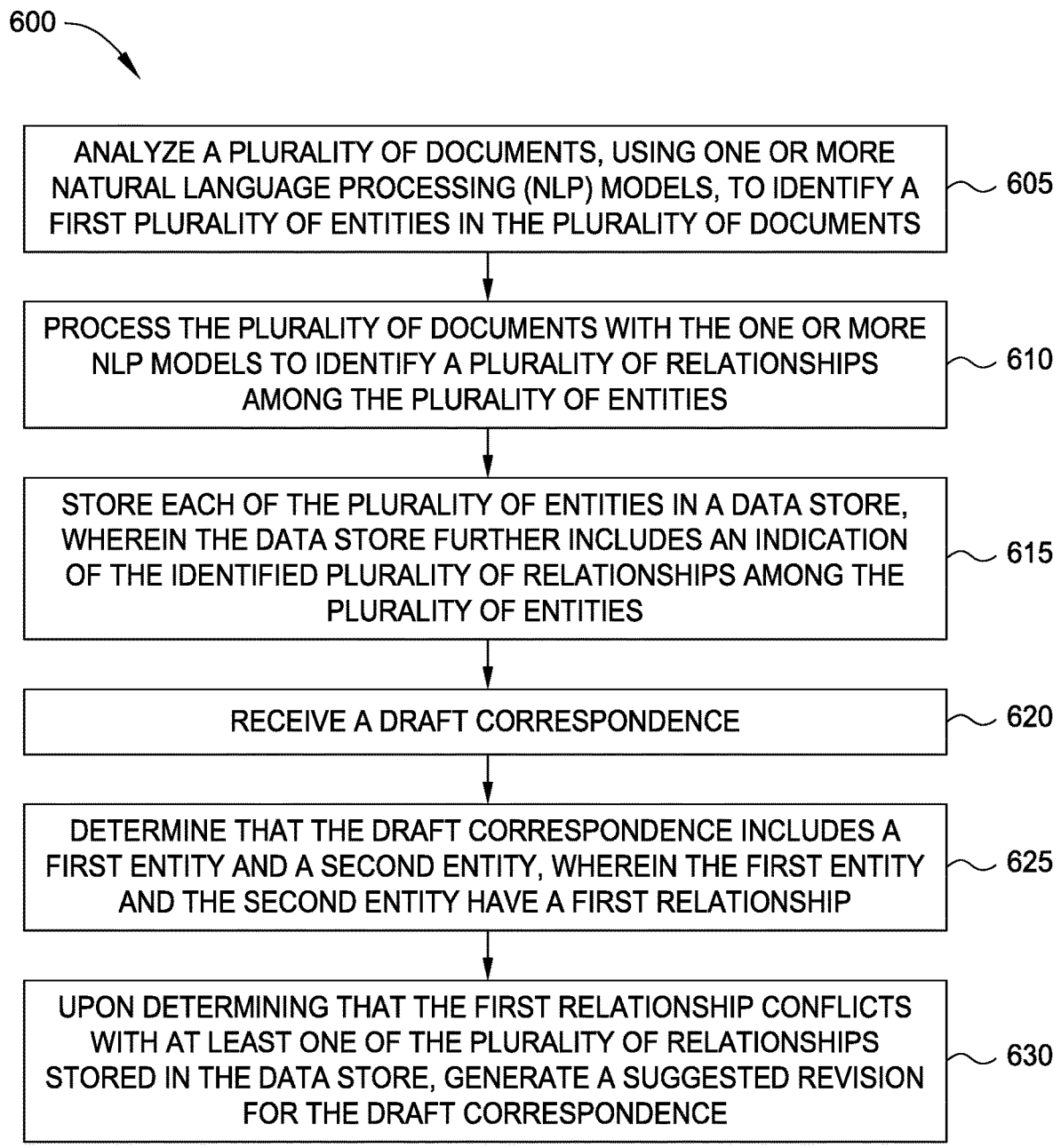
FIG. 6 is a flow diagram illustrating a method for providing content analytics, according to one embodiment disclosed herein.

FIG. 6 is a flow diagram illustrating a method 600 for providing content analytics, according to one embodiment disclosed herein. The method 600 begins at block 605, where the Content Analytics Application 130 analyzes a plurality of documents, using one or more natural language processing (NLP) models, to identify a first plurality of entities in the plurality of documents. The method 600 continues to block 610, where the Content Analytics Application 130 processes the plurality of documents with the one or more NLP models to identify a plurality of relationships among the plurality of entities. At block 615, the Content Analytics Application 130 stores each of the plurality of entities in a data store, wherein the data store further includes an indication of the identified plurality of relationships among the plurality of entities. The method 600 then proceeds to block 620, where the Content Analytics Application 130 receives a draft correspondence. At block 625, the Content Analytics Application 130 determines that the draft correspondence includes a first entity and a second entity, wherein the first entity and the second entity have a first relationship. Finally, at block 630, the Content Analytics Application 130 generates a suggested revision for the draft correspondence upon determining that the first relationship conflicts with at least one of the plurality of relationships stored in the data store.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the Content Analytics Application 130) or related data available in the cloud. For example, the Content Analytics Application 130 could execute on a computing system in the cloud and identify entities and relationships. In such a case, the Content Analytics Application 130 could identify inaccuracies or mistakes, and store the identified entities and relationships at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
analyzing a plurality of documents, using one or more natural language processing (NLP) models, to identify a first plurality of entities and a first plurality of details in the plurality of documents;
processing the plurality of documents with the one or more NLP models to identify, for each respective entity in the first plurality of entities, one or more corresponding details in the first plurality of details that describe the respective entity, wherein a first detail is identified as describing a first entity;
storing each respective entity of the first plurality of entities and the one or more corresponding details describing the respective entity in a data store;
receiving a draft correspondence;
determining that the draft correspondence includes a second entity and a second detail describing the second entity;
determining that the second entity corresponds to the first entity, based on comparing the second entity with each of the first plurality of entities stored in the data store;
upon determining that the second detail conflicts with the first detail, generating a suggested revision for the draft correspondence, wherein the suggested revision includes the first detail;
receiving an indication that the suggested revision has been rejected; and
updating the data store based on the rejection.

2. The method of claim 1, wherein updating the data store comprises:
associating the second detail with the second entity; and
storing the second entity and second detail in the data store, such that the second entity is stored separately and distinct from the first entity.

3. The method of claim 1, wherein updating the data store comprises:
removing the first detail from the data store;
associating the second detail with the first entity; and
storing the second detail in the data store.

4. The method of claim 1, the method further comprising:
analyzing the draft correspondence, using the one or more NLP models, to identify a second plurality of entities and a second plurality of details in the draft correspondence;
identifying, for each respective entity in the second plurality of entities, one or more details in the second plurality of details that describe the respective entity;
determining, for each respective entity of the second plurality of entities, whether the respective entity is already contained in the data store; and
for each respective entity of the second plurality of entities that is not contained in the data store, storing the respective entity and the one or more corresponding details in the data store.

5. The method of claim 4, the method further comprising, for each respective entity of the second plurality of entities that is contained in the data store:
storing the one or more corresponding details in the second plurality of details associated with the respective entity in the data store.

6. The method of claim 1, wherein comparing the second entity with each of the first plurality of entities stored in the data store comprises processing text associated with the second entity with text associated with each of the first plurality of entities with the one or more NLP models.

7. The method of claim 6, wherein determining that the second entity corresponds to the first entity comprises determining that the text associated with the second entity is synonymous with text associated with the first entity.

8. The method of claim 7, wherein the first plurality of details comprise:
(i) a date associated with an entity;
(ii) a time associated with an entity;
(iii) an attendee or provider associated with an entity;
(iv) a name associated with an entity; and
(v) a location associated with an entity.

9. A computer program product comprising a computer-readable storage medium having computer-readable program code embodied therewith, the computer-readable program code executable by one or more computer processors to perform an operation comprising:
analyzing a plurality of documents, using one or more natural language processing (NLP) models, to identify a first plurality of entities in the plurality of documents;
processing the plurality of documents with the one or more NLP models to identify a first plurality of relationships among the first plurality of entities;
storing each of the first plurality of entities in a data store, wherein the data store further includes an indication of the identified first plurality of relationships among the first plurality of entities;
receiving a draft correspondence;
determining that the draft correspondence includes a first entity and a second entity, wherein the first entity and the second entity have a first relationship;
upon determining that the first relationship conflicts with at least one of the first plurality of relationships stored in the data store, generating a suggested revision for the draft correspondence;
receiving an indication that the suggested revision has been rejected; and
updating the data store based on the rejection.

10. The computer program product of claim 9, wherein updating the data store based on the rejection comprises:
removing the at least one of the first plurality of relationships from the data store.

11. The computer program product of claim 9, wherein updating the data store based on the rejection comprises:
reducing a weight associated with the at least one of the first plurality of relationships from the data store.

12. The computer program product of claim 9, the operation further comprising:
analyzing the draft correspondence, using the one or more NLP models, to identify a second plurality of entities and a second plurality of relationships among the second plurality of entities;
determining, for each respective entity of the second plurality of entities, whether the respective entity is already contained in the data store; and
for each respective entity of the second plurality of entities that is not contained in the data store, storing the respective entity in the data store.

13. The computer program product of claim 12, the operation further comprising, for each respective entity of the second plurality of entities that is contained in the data store:
storing any relationships in the second plurality of relationships that are associated with the respective entity in the data store.

14. The computer program product of claim 12, wherein determining, for each respective entity of the second plurality of entities, whether the respective entity is already contained in the data store comprises:
determining a number of relationships associated with the respective entity that match with relationships associated with each of the first plurality of entities.

15. A system comprising:
one or more computer processors; and
a memory containing a program which when executed by the one or more computer processors performs an operation, the operation comprising:
analyzing a plurality of documents, using one or more natural language processing (NLP) models, to identify a first plurality of entities and a first plurality of details in the plurality of documents;
processing the plurality of documents with the one or more NLP models to identify, for each respective entity in the first plurality of entities, one or more corresponding details in the first plurality of details that describe the respective entity, wherein a first detail is identified as describing a first entity;
storing each respective entity of the first plurality of entities and the one or more corresponding details describing the respective entity in a data store;
receiving a draft correspondence;
determining that the draft correspondence includes a second entity and a second detail describing the second entity;
determining that the second entity corresponds to the first entity, based on comparing the second entity with each of the first plurality of entities stored in the data store;
upon determining that the second detail conflicts with the first detail, generating a suggested revision for the draft correspondence, wherein the suggested revision includes the first detail;
receiving an indication that the suggested revision has been rejected; and
updating the data store based on the rejection.

16. The system of claim 15, wherein updating the data store based on the rejection comprises:
associating the second detail with the second entity; and
storing the second entity and second detail in the data store, such that the second entity is stored separately and distinct from the first entity.

17. The system of claim 15, wherein updating the data store based on the rejection comprises:
removing the first detail from the data store;
associating the second detail with the first entity; and
storing the second detail in the data store.

18. The system of claim 15, the operation further comprising:
analyzing the draft correspondence, using the one or more NLP models, to identify a second plurality of entities and a second plurality of details in the draft correspondence;
identifying, for each respective entity in the second plurality of entities, one or more details in the second plurality of details that describe the respective entity;
determining, for each respective entity of the second plurality of entities, whether the respective entity is already contained in the data store; and
for each respective entity of the second plurality of entities that is not contained in the data store, storing the respective entity and the one or more corresponding details in the data store.

19. The system of claim 18, the operation further comprising, for each respective entity of the second plurality of entities that is contained in the data store:
storing the one or more corresponding details in the second plurality of details associated with the respective entity in the data store.

* * * * *